United States Patent
Lee et al.

(10) Patent No.: US 9,817,201 B2
(45) Date of Patent: Nov. 14, 2017

(54) SLIDING ASSEMBLY AND METHOD FOR FIBER MANAGEMENT

(71) Applicant: Ciena Corporation, Hanover, MD (US)

(72) Inventors: Cindy Lee, Kanata (CA); Frederick Craig, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/096,405

(22) Filed: Apr. 12, 2016

(65) Prior Publication Data

US 2017/0293098 A1  Oct. 12, 2017

(51) Int. Cl.
*G02B 6/00* (2006.01)
*G02B 6/44* (2006.01)
*G02B 6/38* (2006.01)

(52) U.S. Cl.
CPC ......... *G02B 6/4455* (2013.01); *G02B 6/3897* (2013.01); *G02B 6/445* (2013.01)

(58) Field of Classification Search
CPC ..... G02B 6/4455; G02B 6/3897; G02B 6/445
USPC ........................................................ 385/135
See application file for complete search history.

(56) References Cited

U.S. PATENT DOCUMENTS

| | | | |
|---|---|---|---|
| 6,748,154 B2 | 6/2004 | O'Leary et al. | |
| 6,748,155 B2 | 6/2004 | Kim et al. | |
| 7,079,744 B2 | 7/2006 | Douglas et al. | |
| 7,385,141 B2 * | 6/2008 | Keith | H04Q 1/06 174/135 |
| 7,454,113 B2 * | 11/2008 | Barnes | G02B 6/4453 361/727 |
| 7,509,015 B2 | 3/2009 | Murano | |
| 7,570,861 B2 | 8/2009 | Smrha et al. | |
| 7,711,233 B2 | 5/2010 | MaHoney | |
| 8,208,480 B2 | 6/2012 | Lund | |
| 8,331,752 B2 | 12/2012 | Biribuze et al. | |
| 2003/0165315 A1 | 9/2003 | Trebesch et al. | |
| 2004/0258384 A1 | 12/2004 | Trebesch et al. | |
| 2006/0275008 A1 * | 12/2006 | Xin | G02B 6/4455 385/135 |
| 2008/0085092 A1 | 4/2008 | Barnes | |
| 2009/0226142 A1 | 9/2009 | Barnes et al. | |
| 2011/0110639 A1 | 5/2011 | Barnes et al. | |
| 2014/0086545 A1 * | 3/2014 | Solheid | G02B 6/4453 385/135 |

* cited by examiner

*Primary Examiner* — Jerry Blevins
(74) *Attorney, Agent, or Firm* — Clements Bernard Walker PLLC; Christopher L. Bernard; Lawrence A. Baratta, Jr.

(57) ABSTRACT

A hybrid chassis for fiber management includes a fixed tray adapted to mount to one of a rack and a frame; a sliding chassis assembly housed in the fixed tray; fiber connectors on a front faceplate of the sliding chassis assembly; internal cross connections in the sliding chassis assembly between the fiber connectors; and a sliding mechanism between the sliding chassis assembly and the fixed tray providing constrained sliding of the sliding chassis assembly between at least two positions including an operating, recessed position and a maintenance, fiber access position. In the operating, recessed position, the sliding chassis assembly can be recessed by about 3.3" in the fixed tray, wherein, in the maintenance, fiber access position, the sliding chassis assembly can be recessed by about 1.3" for fiber access, and wherein the constrained sliding can be about 2".

20 Claims, 20 Drawing Sheets

SLIDING ASSEMBLY AND METHOD FOR FIBER MANAGEMENT

FIELD OF THE DISCLOSURE

The present disclosure generally relates to networking hardware systems and methods. More particularly, the present disclosure relates to a sliding assembly and method for fiber management, such as in an optical network element or the like.

BACKGROUND OF THE DISCLOSURE

Physical networking hardware is continually increasing density, namely increased port count in less space. In data centers, content centers, Central Offices (CO), Points-of-Presence (POPs), transmission huts, and other physical locations, network elements are typically deployed in a rack or frame. One particular type of network element is an optical network element which can provide Wavelength Division Multiplexing (WDM), Time Division Multiplexing (TDM), and/or packet switching. In WDM, for example, there are various components, such as multiplexers, demultiplexers, transceivers, optical amplifiers, wavelength switches, Optical Power Monitors (OPMs), Optical Time Domain Reflectometers (OTDR), Optical Supervisory Channels (OSCs), and the like, in a network element that have to be connected to one another. Such interconnection functionality in a network element can be physically realized through a so-called Fiber Interconnect Module (FIM). Based on the ever increasing density requirements, physical access to such FIM modules remains a challenge. Specifically, in the context of the smaller real estate, operators and technicians still require physical hand access for fiber connections.

One known approach to solving these constraints involves a head and boot tool which is used to insert and remove fiber connectors. The head and boot tool can minimize the depth offset required for a faceplate of the FIM module. However, the head and boot tool can only progress so far in terms of dimensions due to the minimum fiber bend radius which produces a limit on the minimum amount of backspace requirement for fiber management. Another known approach is a sliding assembly which enables the fiber management to slide out when the operation is required. However, the sliding assembly causes issues relative to fiber slack management and other issues due to full sliding movement (e.g., grounding). In a fixed chassis, the fiber management module has a simple construction, no dynamic motion of fibers or cables during access, but suffers from difficult hand access specifically for bulky cables such as Multifiber Push-On (MPO) and limitations on the head and boot tool. Specifically, conventional recess requirements for a faceplate with Lucent Connector (LC) connectors was about 2-3" and with newer MPO connectors, the recess is greater resulting in further access complications. Conventional sliding assemblies have a complex construction, large motion of fibers or cables during access, an ability for backside access, and superior physical hand access relative to the fixed chassis. However, these conventional sliding assemblies require additional mechanisms for fiber slack management.

Referring to FIGS. 1 and 2, in a conventional embodiment, a fixed chassis 10 is illustrated. FIG. 1 illustrates a perspective view of the fixed chassis 10 with a door 12 open for access to fiber connectors 14. FIG. 2 illustrates a top view of the fixed chassis 10 with a top cover 16 removed illustrating physical access to the fiber connectors 14. Specifically, in the example of FIGS. 1 and 2, the fixed chassis 10 includes the fiber connectors 14 which are a Standard Connector (SC) connector 14a and an LC connector 14b with an attenuator. An open area 18 where the fiber connectors 14a, 14b are located is surrounded by chassis walls. As shown in FIG. 2, the open area 18 has the fiber connectors 14a, 14b recessed, and physical hand access is quite challenging with the fixed chassis 10. For example, the fiber connectors 14a, 14b can be recessed more than 2.5", which is at the far limit of hand access. Note, the amount of recess is determined by the connector types to allow the door 12 to close properly. Also, newer connectors, such as MPO, require more recess than 2.5", further causing problems for hand access in the fixed chassis 10.

Referring to FIGS. 3 and 4, in another conventional embodiment, a fully sliding chassis 20 is illustrated. FIG. 3 illustrates a perspective view of the fully sliding chassis 20 with a drawer 22 open. FIG. 4 illustrates a top view of the drawer 22 of the fully sliding chassis 20. The fully sliding chassis 20 includes the drawer 22 which is configured to slide fully in and out of the fully sliding chassis 20 with fiber connectors 24 accessible in the drawer 22. As shown in FIGS. 3 and 4, the fully sliding chassis 20 requires significant fiber slack management, such as through guides 26 and spools 28 in and on the drawer 22. In FIG. 4, it is shown that the drawer 22, in the out position, supports access to the fiber connectors 24 both from a front side 30 (equipment side) and a back side 32 (customer premise side) for cleaning. In addition to the significant fiber slack management, the fully sliding chassis 20 is significantly more expensive and complex.

Accordingly, it would be advantageous to have a sliding assembly and method for an FIM module which can overcome the aforementioned limitations.

BRIEF SUMMARY OF THE DISCLOSURE

In an exemplary embodiment, a hybrid chassis for fiber management includes a fixed tray adapted to mount to one of a rack and a frame; a sliding chassis assembly housed in the fixed tray; fiber connectors on a front faceplate of the sliding chassis assembly; internal cross connections in the sliding chassis assembly between the fiber connectors; and a sliding mechanism between the sliding chassis assembly and the fixed tray providing constrained sliding of the sliding chassis assembly between at least two positions including an operating, recessed position and a maintenance, fiber access position. The sliding mechanism can include a one or more notches on each side of the sliding chassis assembly engaging a slot of each side of the fixed tray, wherein the notches are positioned to provide the constrained sliding. No fiber slack management is required in the hybrid chassis based on the constrained sliding. In the operating, recessed position, the sliding chassis assembly can be recessed by about 3.3" in the fixed tray, wherein, in the maintenance, fiber access position, the sliding chassis assembly can be recessed by about 1.3" for fiber access, and wherein the constrained sliding is about 2". At least one of the fiber connectors can include a Multifiber Push-On (MPO) connector requiring at least 3" of clearance between the front faceplate and a door of the sliding chassis assembly, and wherein the constrained sliding is about 2" to provide physical access to the MPO.

The fiber connectors can include one or more of a Multifiber Push-On (MPO) connector, a Standard Connector (SC), and a Lucent Connector (LC). The hybrid chassis can further include a door rotatably connected to the sliding chassis assembly; and a ground wire connected to the door and the sliding chassis assembly, wherein the ground wire is adapted to maintain grounding whether the door is open or closed. The hybrid chassis can further include a ground wire connected to the fixed tray and the sliding chassis assembly, wherein the ground wire is adapted to maintain grounding in the at least two positions. The hybrid chassis can further include a management port on the front faceplate of the sliding chassis assembly; and a management module in the sliding chassis assembly, wherein the management module is powered via a cable connected to the management port. The hybrid chassis can be front access only and back side fiber connectors coupled to the fiber connectors are cleaned through the fiber connectors. The hybrid chassis can be a Fiber Interface Module and the fiber connectors provide intra-network element connectivity between modules of an optical network element.

In another exemplary embodiment, a method for a hybrid chassis for fiber management includes providing a fixed tray adapted to mount to one of a rack and a frame; providing a sliding chassis assembly housed in the fixed tray; providing fiber connectors on a front faceplate of the sliding chassis assembly; providing internal cross connections in the sliding chassis assembly between the fiber connectors; and providing a sliding mechanism between the sliding chassis assembly and the fixed tray providing constrained sliding of the sliding chassis assembly between at least two positions including an operating, recessed position and a maintenance, fiber access position. The sliding mechanism can include a one or more notches on each side of the sliding chassis assembly engaging a slot of each side of the fixed tray, wherein the notches are positioned to provide the constrained sliding. No fiber slack management is required in the hybrid chassis based on the constrained sliding. In the operating, recessed position, the sliding chassis assembly can be recessed by about 3.3" in the fixed tray, wherein, in the maintenance, fiber access position, the sliding chassis assembly can be recessed by about 1.3" for fiber access, and wherein the constrained sliding is about 2".

At least one of the fiber connectors can include a Multi-fiber Push-On (MPO) connector requiring at least 3" of clearance between the front faceplate and a door of the sliding chassis assembly, and wherein the constrained sliding is about 2" to provide physical access to the MPO. The method can further include providing a door rotatably connected to the sliding chassis assembly; and providing a ground wire connected to the door and the sliding chassis assembly, wherein the ground wire is adapted to maintain grounding whether the door is open or closed. The method can further include providing a ground wire connected to the fixed tray and the sliding chassis assembly, wherein the ground wire is adapted to maintain grounding in the at least two positions. The method can further include providing a management port on the front faceplate of the sliding chassis assembly; and providing a management module in the sliding chassis assembly, wherein the management module is powered via a cable connected to the management port. The hybrid chassis can be front access only and back side fiber connectors coupled to the fiber connectors are cleaned through the fiber connectors.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to a sliding assembly and method for fiber management, such as in an optical network element or the like. Specifically, the sliding assembly is a hybrid chassis which is a simpler construction relative to the conventional sliding assemblies which intentionally limit the motion of fibers or cables during access to remove the requirements for fiber slack management, while also providing superior hand access relative to the fixed chassis. The FIM module in the hybrid chassis may be used in a rack or frame in a small housing (e.g., 1-2 Rack Units (RUs)). In an exemplary embodiment, the FIM module is used for intra-network element connectivity between modules and the like. This hybrid chassis provides a simpler and more ergonomic means of installing and dressing fiber in small rack mounted telecom enclosures, 1-2 RUs. Very limited finger access exists to dress fiber in these units, conventionally, which is compounded by required setback clearances for the fiber connector boot. To remedy these issues, the hybrid chassis slides forward within a fixed rack mounted tray, which brings the faceplate forward and provides greatly improved finger and visual access to connect and dress the fiber. The portion of the chassis that is above the faceplate is left open in order to provide additional clearance. Also, to overcome the aforementioned limitations of conventional sliding assemblies, the sliding travel range of the hybrid chassis is controlled to allow for optimal fiber dressing, to avoid the need for fiber slack management, to enable grounding, and to enable only front access.

The hybrid chassis greatly increases ease of installability for a customer, i.e., it is more user-friendly configuration for the customer when fibers need to be changed, cleaned, or re-routed. This translates into shorter install times and greater customer satisfaction, which in turn, benefits operators, vendors, etc. By moving the faceplate forward in the hybrid chassis, the fiber connector head and boot dimension become a non-issue. Fibers can be installed and dressed easily by the operator, and the faceplate can then be slid back into the standard operating position of the equipment once fiber dressing is finished.

Figure 1:
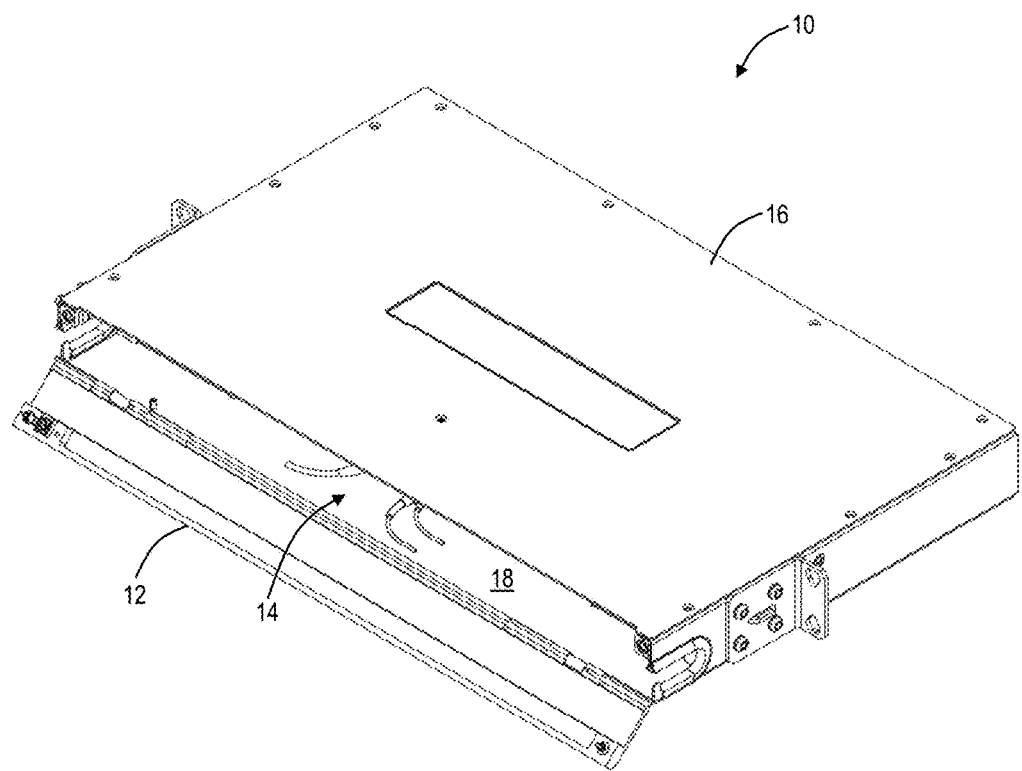
FIG. 1 is a perspective view of a fixed chassis with a door open for access to fiber connectors.
Figure 2:
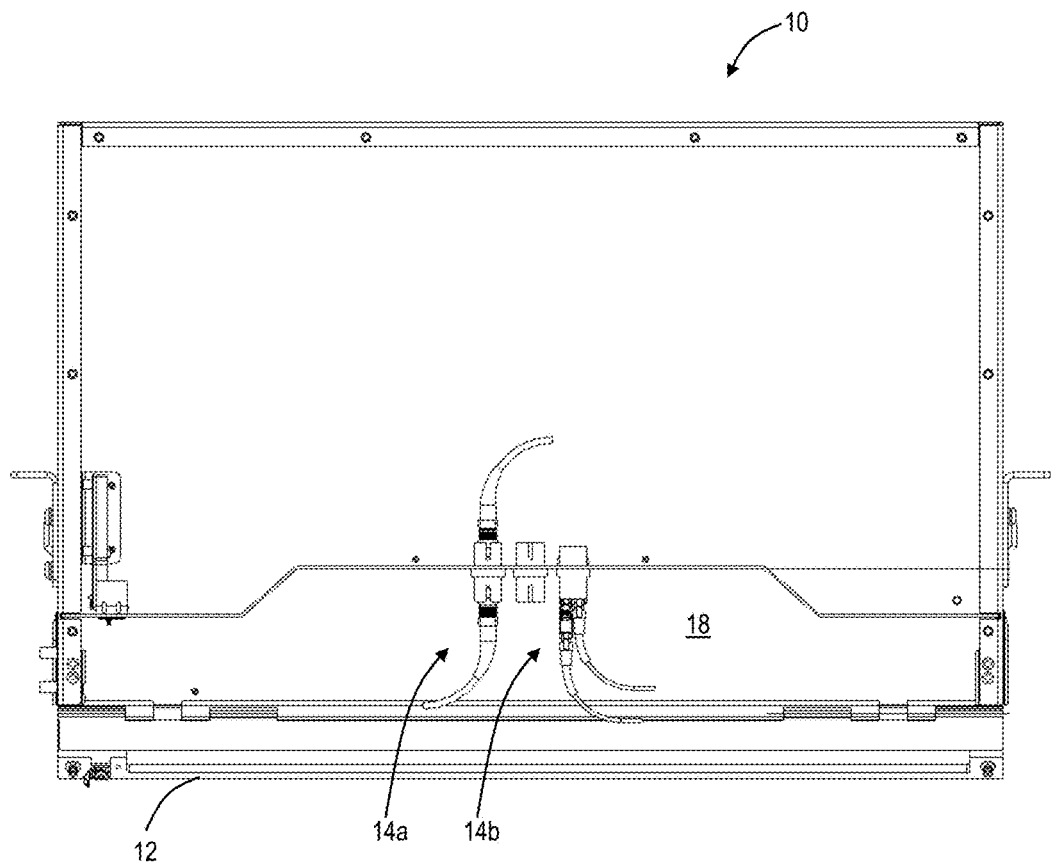
FIG. 2 is a top view of the fixed chassis of FIG. 1 with a top cover removed illustrating physical access to the fiber connectors.
Figure 3:
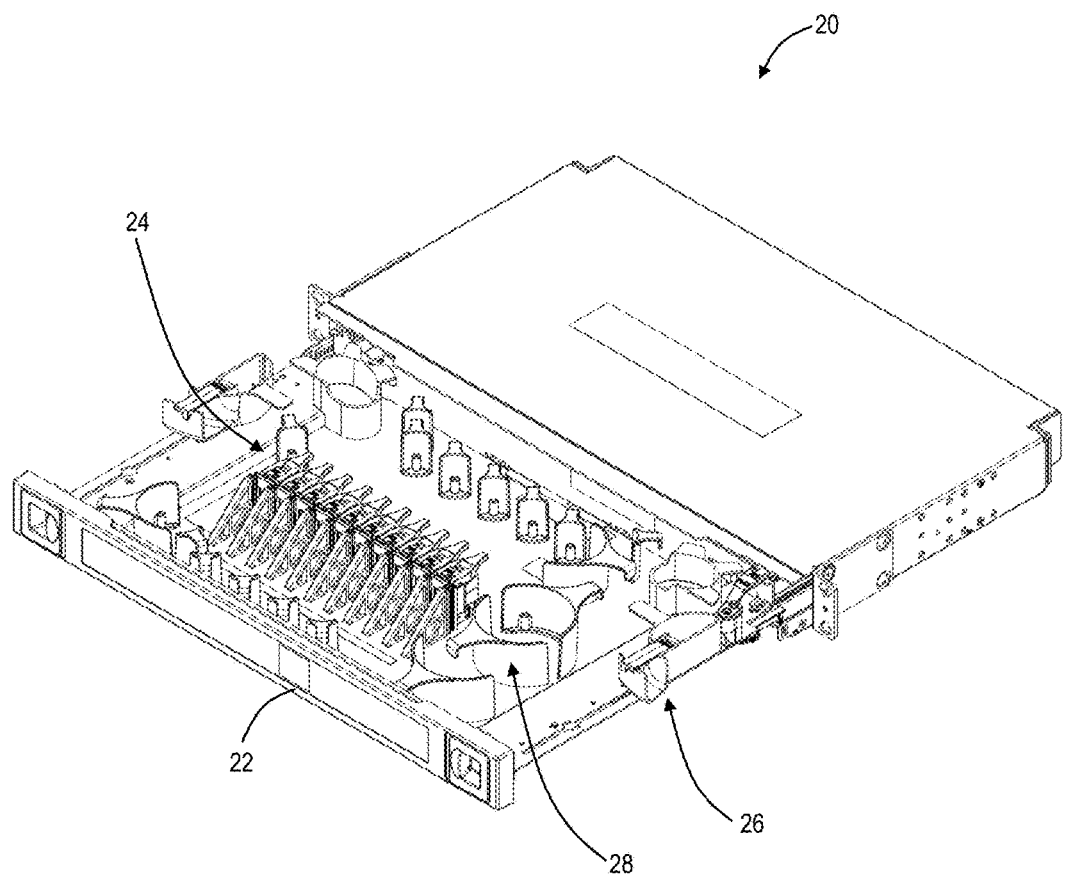
FIG. 3 is a perspective view of a fully sliding chassis with a drawer open.
Figure 4:
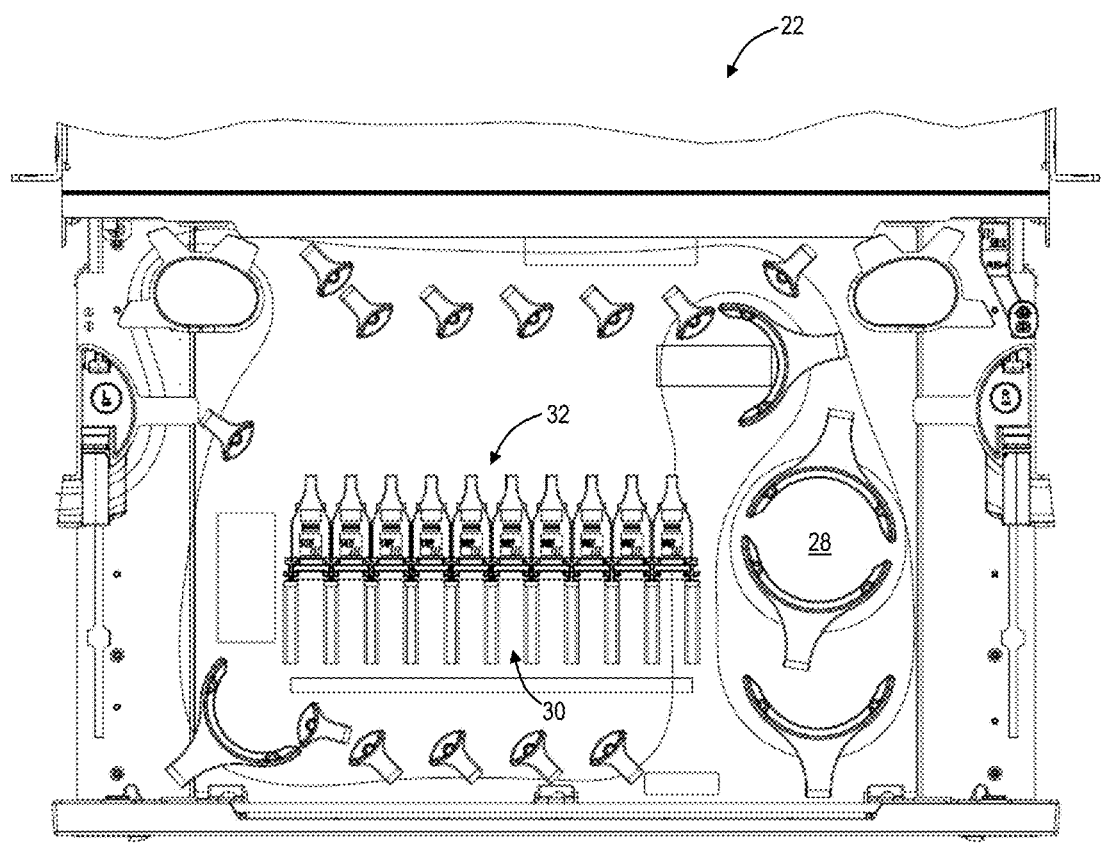
FIG. 4 is a top view of the drawer of the fully sliding chassis of FIG. 3.
Figure 5:
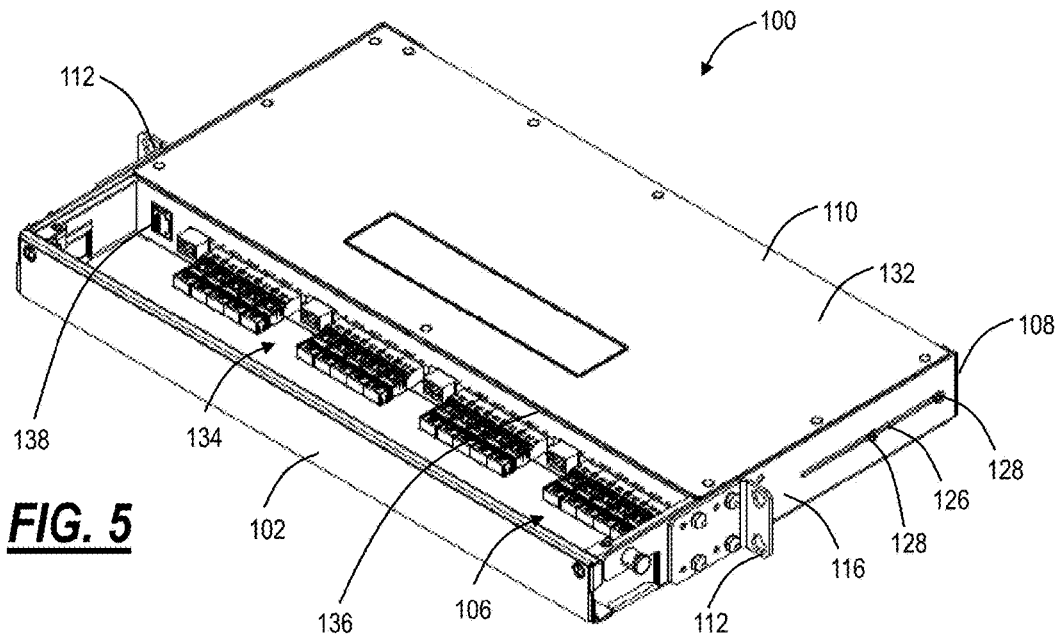
FIG. 5 is a front perspective view of a hybrid chassis with a door closed.
Figure 6:
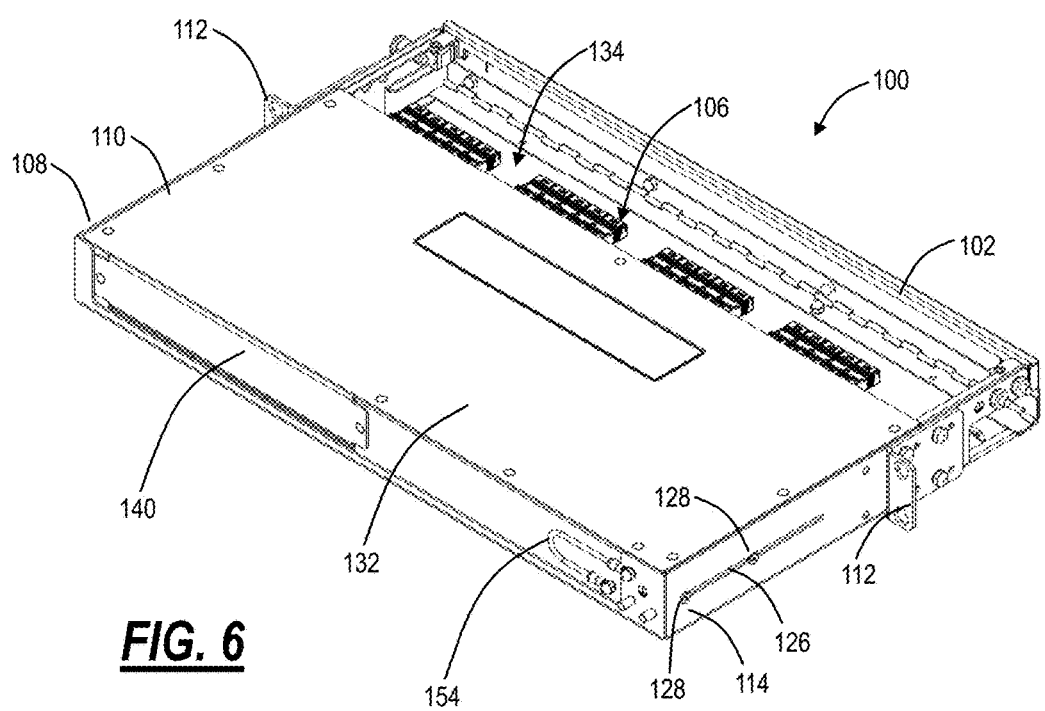
FIG. 6 is a rear perspective view of the hybrid chassis of FIG. 5 with the door closed.
Figure 7:
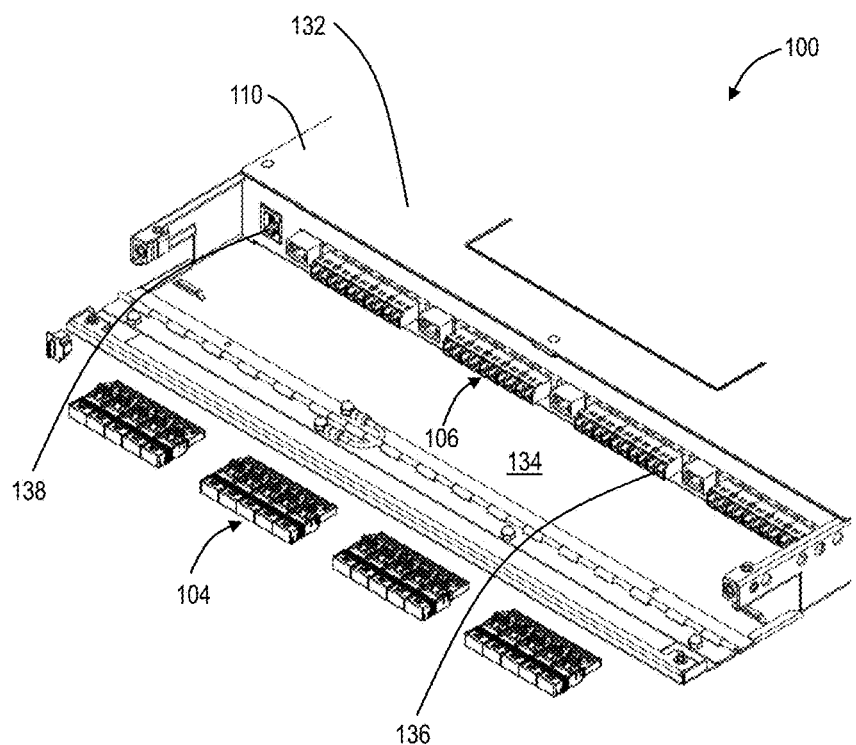
FIG. 7 is a front perspective view of the hybrid chassis of FIGS. 5 and 6 with the door open and with various fiber connectors.
Figure 8:
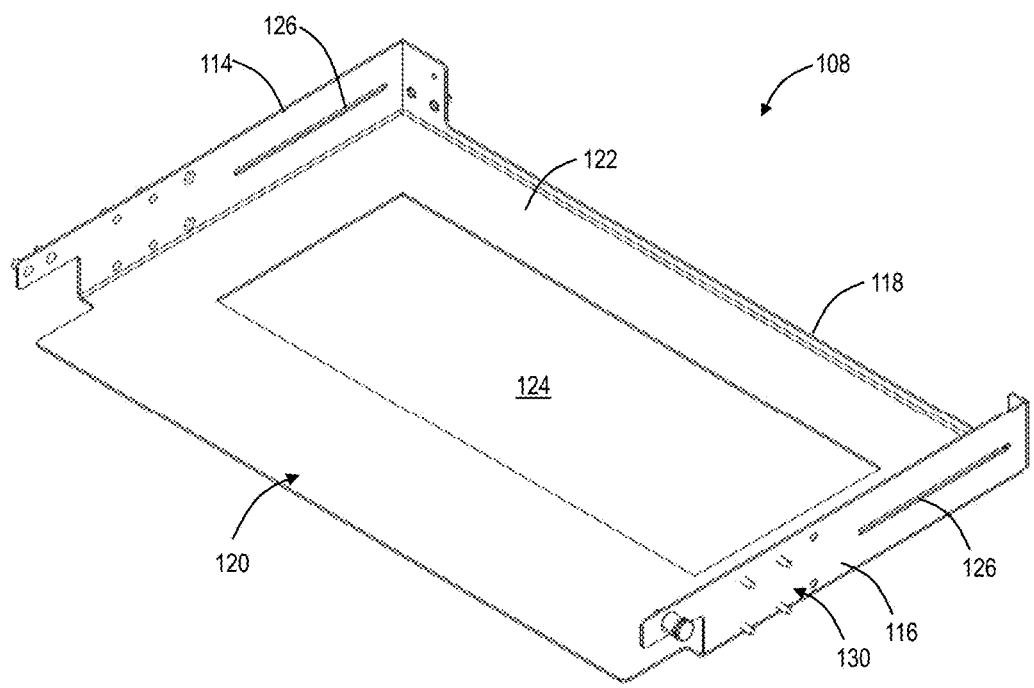
FIG. 8 is a fixed tray in the hybrid chassis of FIGS. 5-7 adapted to house a sliding chassis assembly which includes the fiber connectors of FIG. 7.
Figure 9:
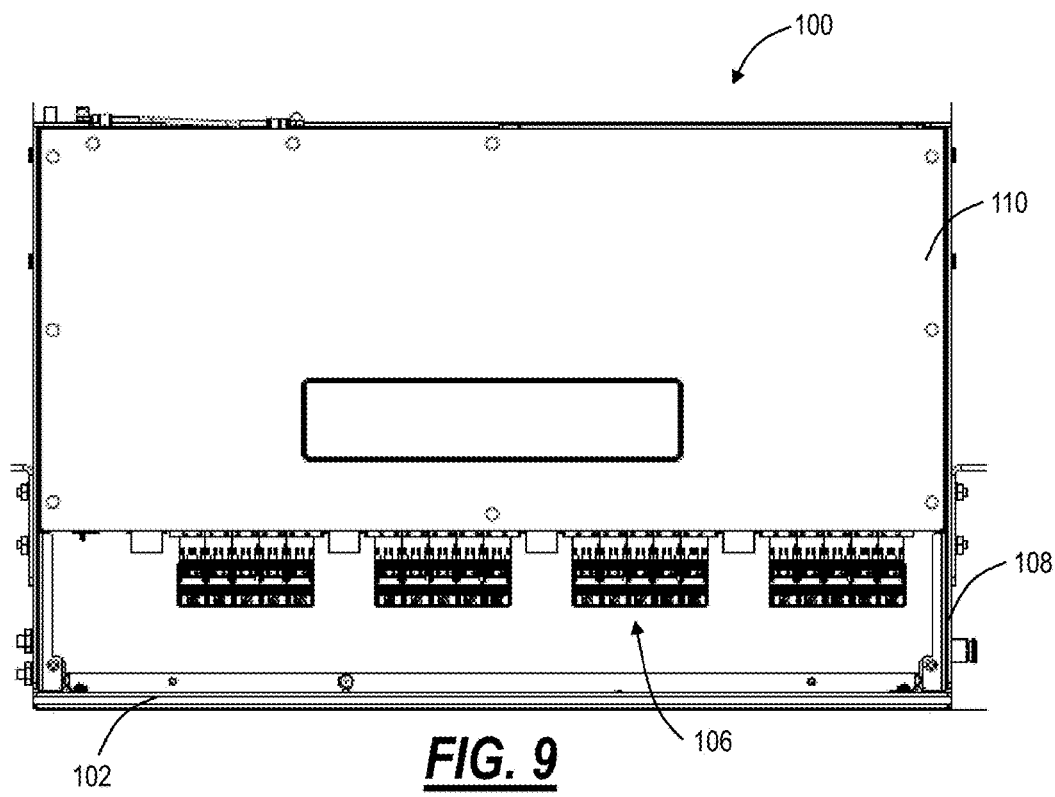
FIG. 9 is a top view of the hybrid chassis of FIGS. 5-8 with the door closed.
Figure 10:
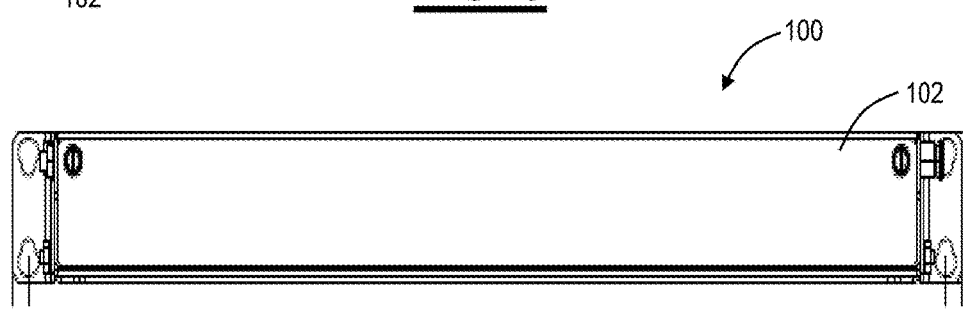
FIG. 10 is a front view of the hybrid chassis of FIGS. 5-9 with the door closed.
Figure 11:
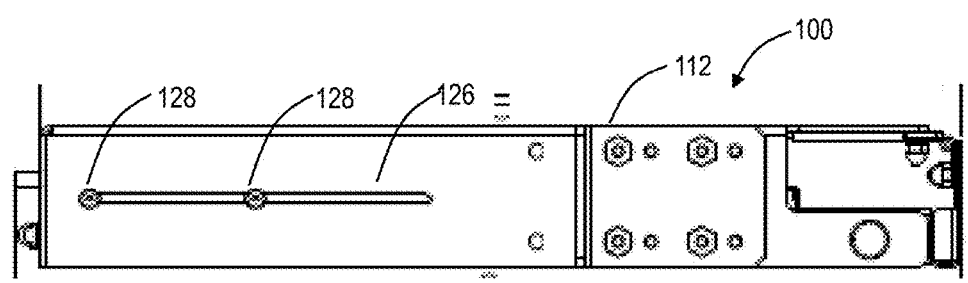
FIG. 11 is a side view of the hybrid chassis of FIGS. 5-10 with the door closed.

Referring to FIGS. 5-11, in an exemplary embodiment, perspective diagrams illustrate a hybrid chassis 100. FIG. 5 illustrates a front perspective view of the hybrid chassis 100 with a door 102 closed; FIG. 6 illustrates a rear perspective view of the hybrid chassis 100 with the door 102 closed; FIG. 7 illustrates a front perspective view of the hybrid chassis 100 with the door 102 open and with various fiber connectors 104, 106; and FIG. 8 illustrates a fixed tray 108 adapted to house a sliding chassis assembly 110 which includes the fiber connectors 106. The door 102 is connected to the sliding chassis assembly 110 via a hinge connection, allowing the door 102 to rotate open and closed. FIG. 9 illustrates a top view of the hybrid chassis 100 with the door 102 closed, FIG. 10 illustrates a front view of the hybrid chassis 100 with the door 102 closed, and FIG. 11 illustrates a side view of the hybrid chassis 100 with the door 102 closed.

In an exemplary embodiment, the hybrid chassis 100 is 1-2 RUs high, i.e., a "pizza box" enclosure, and rack mountable. The fixed tray 108 is mountable to a rack such as through side brackets 112 or the like. For example, the rack can include 19-inch rack, a 23-inch rack, an ETSI rack, an Electronic Industries Alliance (EIA) rack, a Consumer Electronics Association (CEA) rack, an International Electrotechnical Commission (IEC) rack, a Western Electric Company (WECO) rack, or the like. Specifically, the fixed tray 108, once rack mounted, does not move. The fixed tray 108 is configured to support the sliding chassis assembly 110 and to enable constrained sliding movement of the sliding chassis assembly 110.

The fixed tray 108 can include sides 114, 116, a substantially open back 118, an open front 120, an open top, and a bottom portion 122 with an opening 124. Again, the function of the fixed tray 108 is to support the sliding chassis assembly 110 and to connect fixedly to the rack. The sides 114, 116 can include a slot 126. The sliding chassis assembly 110 can include one or more notches 128 on sides opposing the sides 116, 114. For example, the notch 128 can be a shoulder screw or the like. The notches 128 engage the slot 126, enabling sliding movement by the sliding chassis assembly 110 relative to the fixed tray 108. The sides 114, 116 can also include holes and pins 130 for connections to the side brackets 112. In an exemplary embodiment, the fixed tray 108 can be sheet metal, hardened plastic, or some other suitable material. The opening 124 enables additional airflow around and through the hybrid chassis 100 and reduces any friction between the sliding chassis assembly 110 and the fixed tray 108. The open back 118 also allows rear access to the sliding chassis assembly 110, if required, for maintenance or accessibility.

Importantly, the slot 126 and the notches 128 provide constrained movement. That is, the sliding chassis assembly 110 only slides a small amount (e.g., 2-3", etc.) to limit intentionally the motion of fibers or cables during access to remove the requirements for fiber slack management in the hybrid chassis 100. The sliding travel range, i.e., the small amount, of the hybrid chassis 100 is controlled to allow for optimal fiber dressing, to avoid the need for fiber slack management, to enable grounding, and to enable only front access. The small amount is set based on a length of the slot 126 and/or a location of the notches 128. Also, plungers can be included in the slot 126 to limit the sliding travel range as well as to support multiple positions of the sliding chassis assembly 110. Again, the slot 126 in the fixed tray 108 and the shoulder screws (notches 128) in the sliding chassis assembly 110 provide the desired sliding action for access, but also provide a limited range of motion to achieve optimal fiber dressing.

The sliding chassis assembly 110 has a housing 132 which is a rectangular shape. The housing 132 has about the same height and length as the fixed tray 108, but a slightly smaller depth. The difference in depth enables physical access in an opening 134 which is accessible when the door 102 is opened. The sliding chassis assembly 110 includes a front faceplate 136 which contains the fiber connectors 106 and a management port 138. The fiber connectors 106 can be SC, LC, MPO, attenuators, loopbacks, a combination of the foregoing, or the like. The fiber connectors 106 provide fiber connectivity to an interior of the housing 132 where the fiber connectors 106 are connected appropriately. The management port 138 can be an Ethernet port with Power over Ethernet (POE). In this manner, the hybrid chassis 100 does not require a power connection for management connectivity.

The sliding chassis assembly 110 slides backward and forwards, bringing the front faceplate 136 for physical access. Again, one objective of the hybrid chassis 100 is to support larger, emerging fiber connectors such as MPO. The MPO connector requires the opening 134 to be about 3.3" and having the front faceplate 136 recessed by 3.3" in the fixed tray 108 creates physical access issues. In an exemplary embodiment, the opening 134 has about 3.3" of recess between the door 102 and the front faceplate 136 when the sliding chassis assembly 110 is slid backward in an operating position and about 1.3" of recess when the sliding chassis assembly 110 is slid forwards in a maintenance position. The operating position is when there is no physical access required, i.e., during standard operation, and the maintenance position is when there is physical access required, i.e., during cabling or other maintenance operations. Thus, the sliding chassis assembly 110 is configured to slide by about 2" through the slot 126. Stated differently, the newest product requirement for the fiber connectors 106 is for the front faceplate 136 recessed back 3.3", to accommodate MPO connectors, which further exasperates the issue of finger access. By developing the hybrid chassis 100 that can slide forward by 2", the front faceplate 136 recess is reduced to 1.3".

Again, in an exemplary embodiment, the hybrid chassis 100 is a Fiber Interconnect Module (FIM) that supports connections between various elements in an optical network element (e.g., a Dense Wavelength Division Multiplexing (DWDM)) or the like. The FIM is a centralized fiber access point in the optical network element. For example, the FIM supports connections via the fiber connectors 106 to multiplexer/demultiplexer components, Wavelength Selective Switches (WSSs), Optical Service Channels (OSCs), Optical Time Domain Reflectometers (OTDRs), optical amplifiers such as Erbium Doped Fiber Amplifies (EDFAs) or Raman amplifiers, and the like. Internal to the housing 132, there can be predetermined cross connections between the fiber connectors 106. The hybrid chassis 100 can also include a management module 140 (described in detail as follows) that is used to provide and maintain a connection table in real-time to allow software to perform a connection validation routine. The management module 140 can connect to the management port 138 for data and power and is accessible via a rear side of the housing 132.

Figure 12:
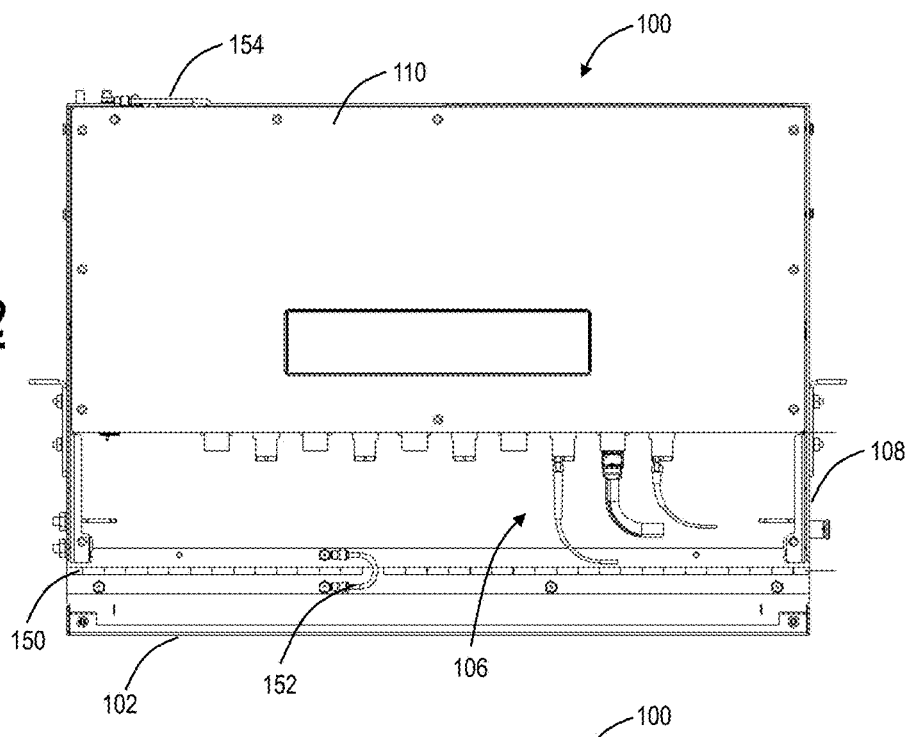
FIG. 12 is a top view of the hybrid chassis of FIGS. 5-11 in an operating position slid backward.
Figure 13:
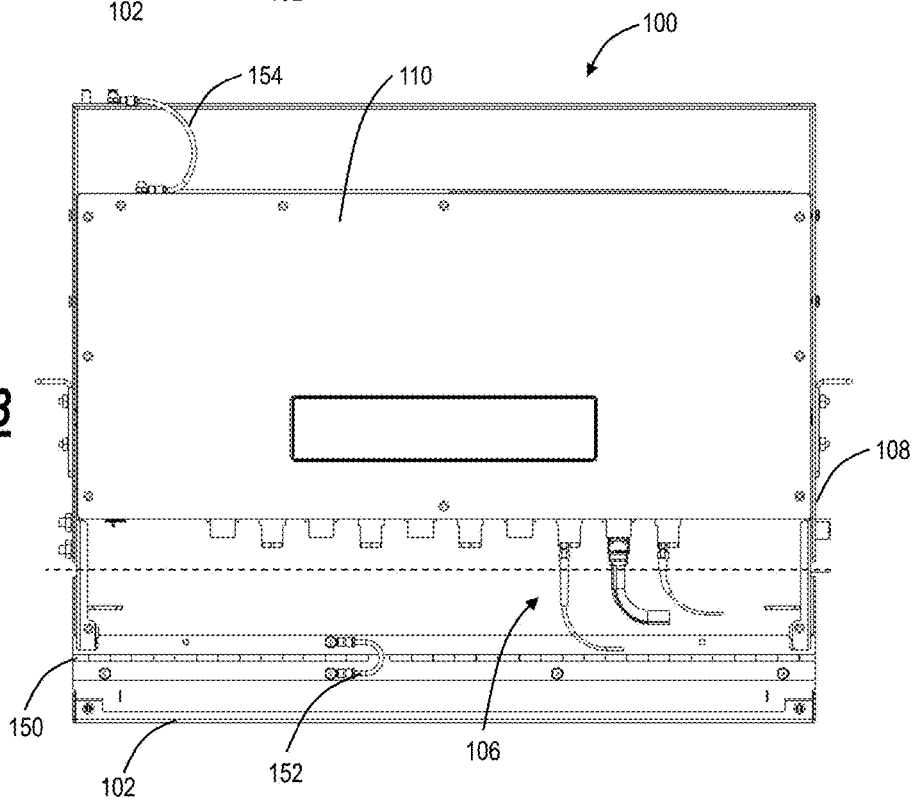
FIG. 13 is a top view of the hybrid chassis of FIGS. 5-11 in a maintenance position slid forwards.

Referring to FIGS. 12 and 13, in an exemplary embodiment, top views illustrate the hybrid chassis 100 in an operating position (FIG. 12) slid backward and in a maintenance position (FIG. 13) slid forwards. In these examples, the fiber connectors 106 include, from left to right, an LC, an MPO, and an LC connector connected thereto. Of course, other types of connectors are also contemplated. In both FIGS. 12 and 13, the door 102 is connected to the sliding chassis assembly 110 via a hinge 150 and is opened. The door 102 includes a ground wire 152 connected to the sliding chassis assembly 110 for grounding. Specifically, the ground wire 152 is connected to each of the door 102 and the sliding chassis assembly 110, such as via screws. Note, the ground wire 152 is required since the door 102 cannot be simply grounded through incidental contact via the hinge 150. Also, a ground wire 154 is connected to the fixed tray 108, such as at the back 118, and the sliding chassis assembly 110, such as on a back of the sliding chassis assembly 110. The ground wires 152, 154 are dimensioned and configured to flex and contract based on the relative movement of the door 102 and the sliding chassis assembly 110. Grounding is simple with the fixed chassis 10 since the entire physical structure is a single unit connected to the rack. However, grounding is a challenge for the drawer 22 in the fully sliding chassis 20 since the drawer 22 fully slides out. The constrained movement in the hybrid chassis 100 supports full grounding via the ground wires 152, 154.

Figure 14:
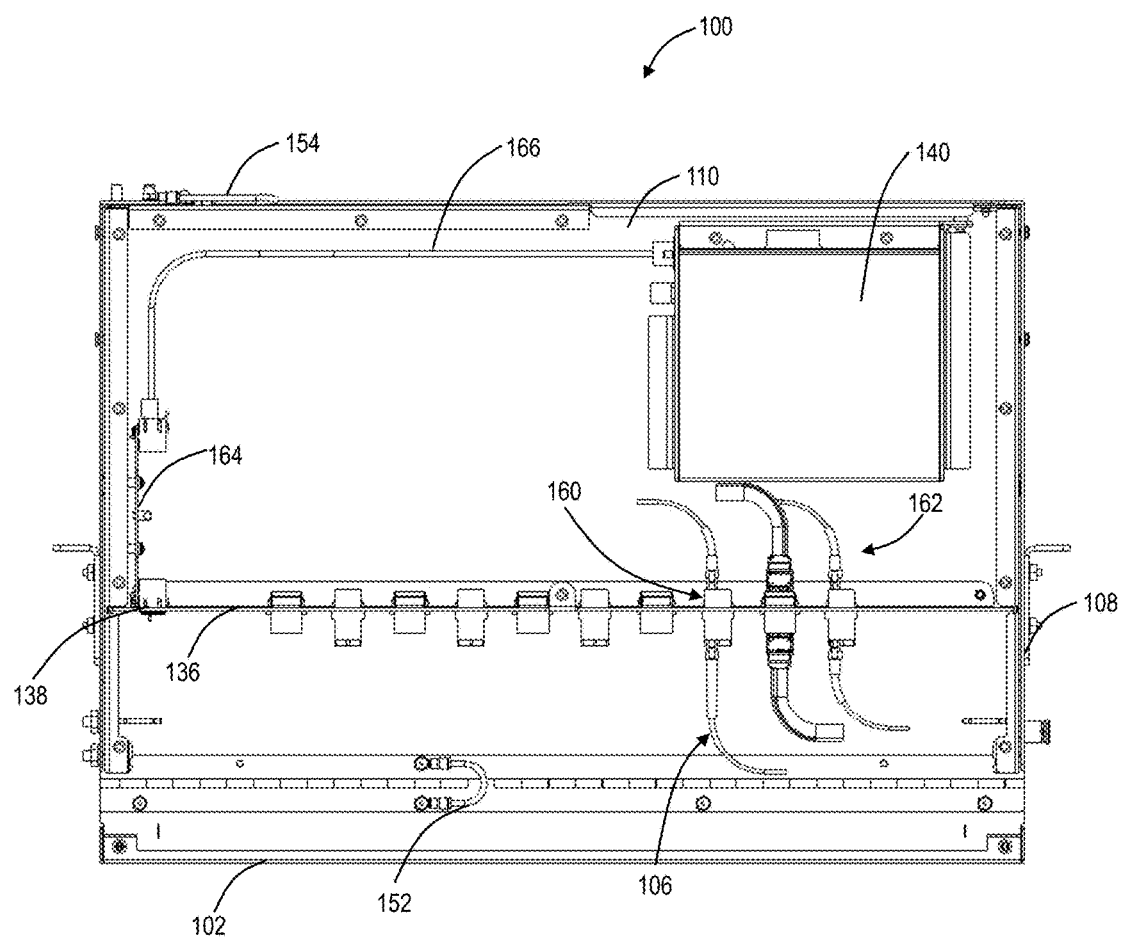
FIG. 14 is a top view of the hybrid chassis of FIGS. 5-13 with a top of the sliding chassis assembly removed for illustration.

Referring to FIG. 14, in an exemplary embodiment, a top view illustrates the hybrid chassis 100 with a top of the sliding chassis assembly 110 removed for illustration. FIG. 14 is similar to FIG. 12 with the sliding chassis assembly 110 in the operating position and with the fiber connectors 106 including, from left to right, an LC, an MPO, and an LC connector connected thereto. The fiber connectors 106 are on the front faceplate 136, and there are back side fiber connectors 160 and cables 162 interconnecting the back side fiber connectors 160, internal to the sliding chassis assembly 110. Again, the back side fiber connectors 160 and the cables 162 provide predetermined fiber cross connections inside the sliding chassis assembly 110. The front faceplate 136 can include labeling for each of the fiber connectors 106 for the appropriate port, e.g., WSS to multiplexer port, WSS to demultiplexer port, etc.

In an exemplary embodiment, the hybrid chassis 100 does not require rear or top access, specifically for cleaning the back side fiber connectors 160. The fiber connectors 106 are adapted to enable cleaning of the back side fiber connectors 160 from the front of the fiber connectors 106 with an associated cleaning tool.

The management module 140 is included in the interior of the sliding chassis assembly 110. The management module 140 can be inserted or removed from the rear of the hybrid chassis 100. The management port 138 can be connected to the management module 140 via a circuit board 164 and a cable 166. In an exemplary embodiment, the management module 140 does not require a separate power connection besides the cable 166 with POE via the management port 138. The management module 140 can provide and maintain a connection table in real-time to for a connection validation routine. For example, the management module 140 can communicate with the optical network element, an Element Management System (EMS), a Network Management System (NMS), or the like. The circuit board 164, in addition to connecting the cable 166 to the management port 138, can include circuitry to identify the hybrid chassis 100. The front faceplate 136 can also have Light Emitting Diodes, powered by the management module 140 for system status. The management module 140 and the circuit board 164 have photodiodes and lower power electronics on them and they can be powered through the RJ45 cable, low current.

Figure 15:
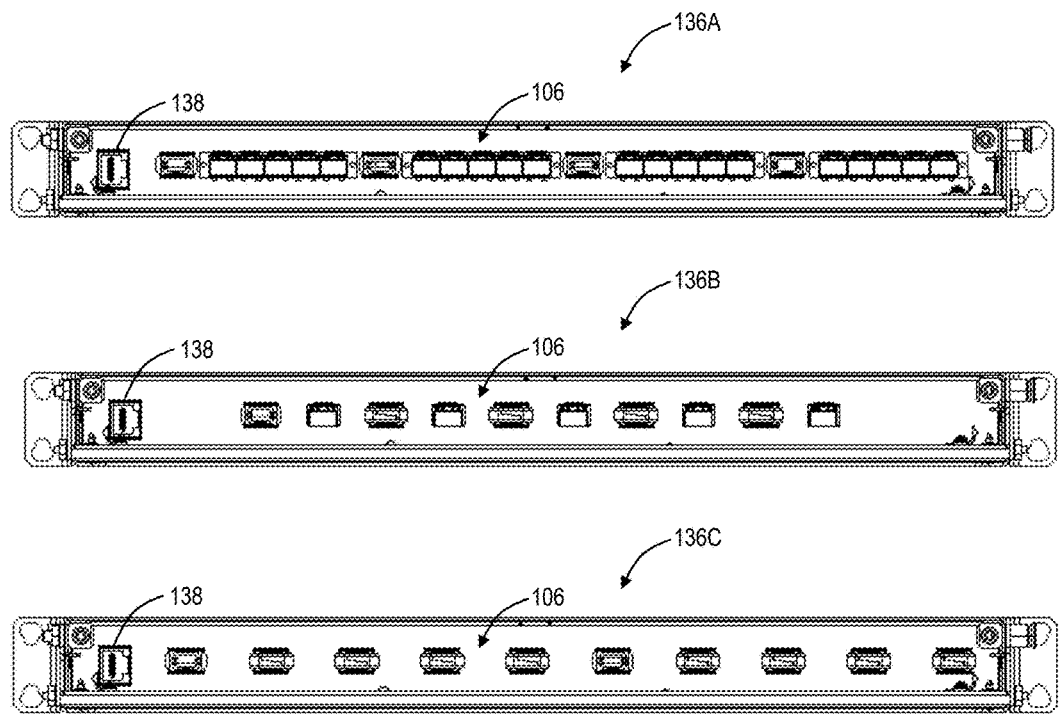
FIG. 15 is front views of three exemplary variations of a front faceplate for the sliding chassis assembly of the hybrid chassis of FIGS. 5-14.

Referring to FIG. 15, in an exemplary embodiment, front views illustrate three exemplary variations of a front faceplate 136A, 136B, 136C for the sliding chassis assembly 110 in the hybrid chassis 100. The hybrid chassis 100 can have a different number of ports and associated fiber connectors 106 based on configuration. For example, a larger optical network element may require more ports than a smaller optical network element. Also, multiple hybrid chassis 100 can be used together to form a larger module, such as in a daisy chain configuration.

Figure 16:
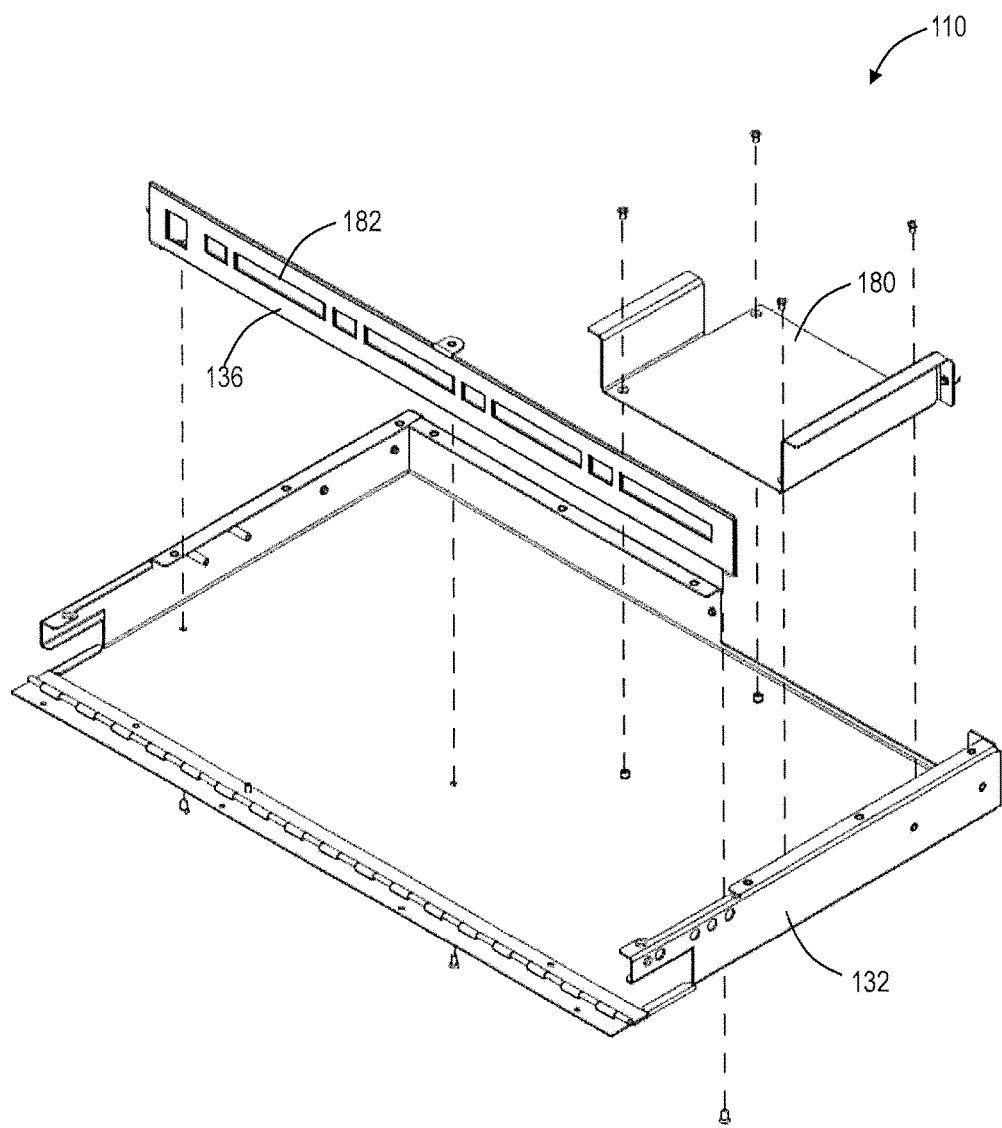
FIG. 16 is a perspective view of a portion of the sliding chassis assembly and insertion of the front faceplate and a management module holder in the sliding chassis assembly of the hybrid chassis of FIGS. 5-15.

Referring to FIGS. 16-21, in an exemplary embodiment, various perspective diagrams illustrate assembly of the hybrid chassis 100. FIGS. 16-21 are illustrated in sequence. FIG. 16 illustrates a portion of the sliding chassis assembly 110 and insertion of the front faceplate 136 and a management module holder 180 in the sliding chassis assembly 110. The front faceplate 136 includes openings 182 for the fiber connectors 106. The front faceplate 136 and the management module holder 180 can be screwed into the sliding chassis assembly 110. The management module holder 180 has side flanges to support the management module 140 which can be selectively inserted, such as through the back of the fixed tray 108.

Figure 17:
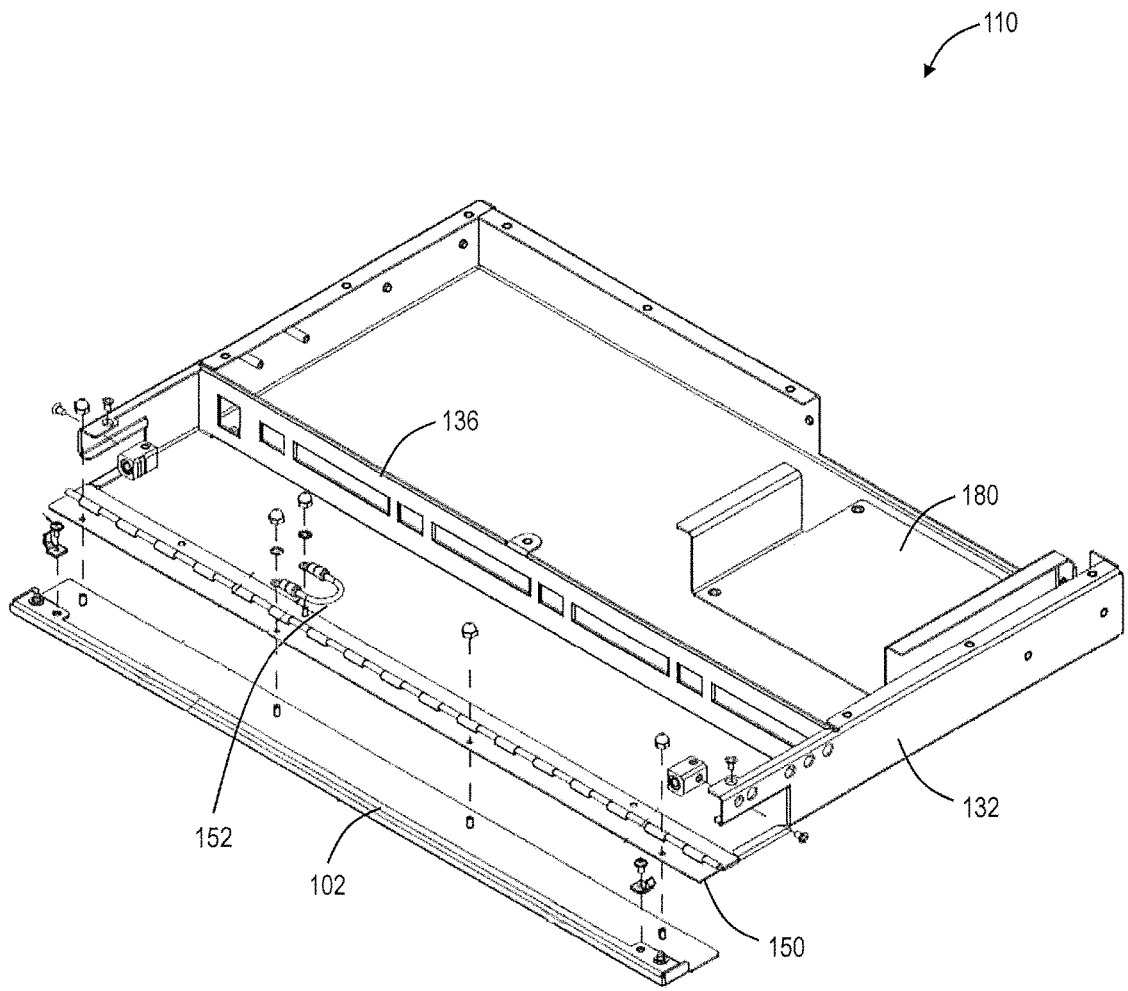
FIG. 17 is a perspective view of the connection of the door and the ground wire to the sliding chassis assembly of the hybrid chassis of FIGS. 5-16.
Figure 18:
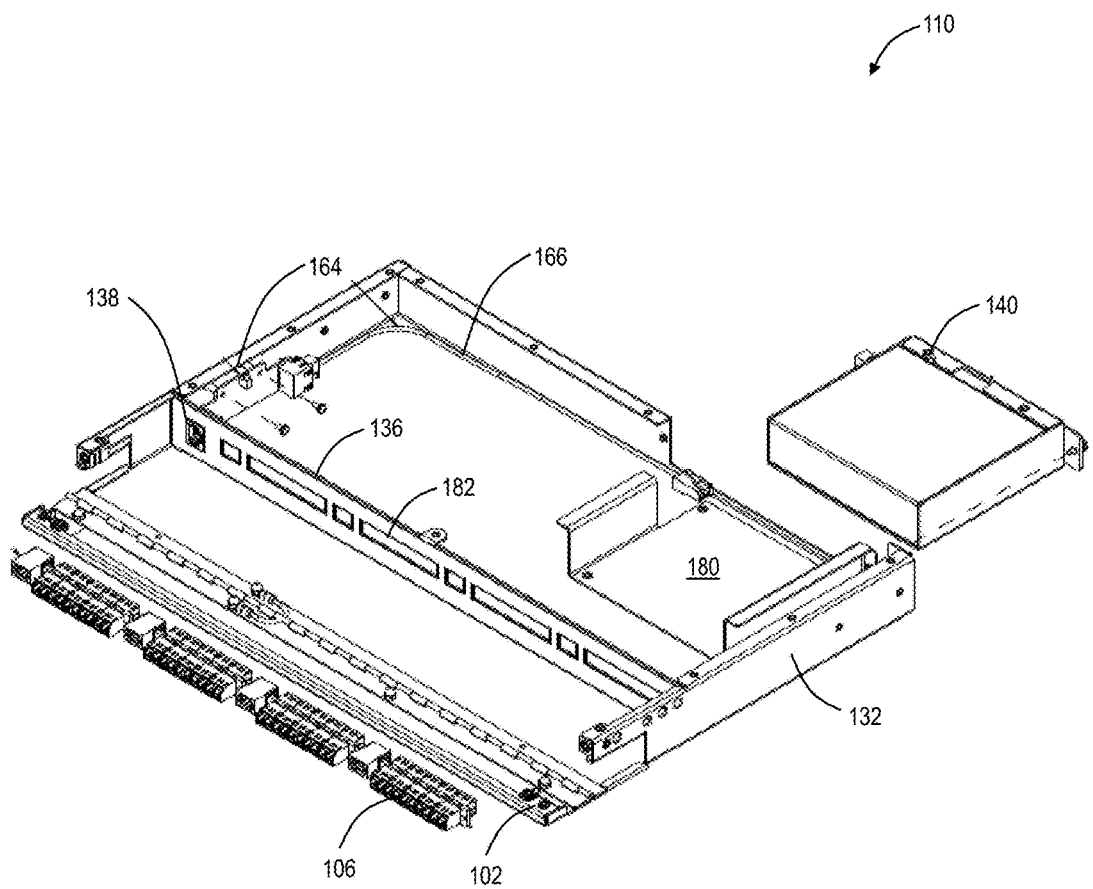
FIG. 18 is a perspective view of the insertion of the management module and associated cabling in the sliding chassis assembly and insertion of the fiber connectors in the sliding chassis assembly of the hybrid chassis of FIGS. 5-17.

FIG. 17 illustrates the connection of the door 102 and the ground wire 152 to the sliding chassis assembly 110. The door 102 is screwed to the hinge 150 and the ground wire 152 is connected to the door 102 and the fixed tray 108. FIG.

18 illustrates the insertion of the management module 140 and associated cabling in the sliding chassis assembly 110 and insertion of the fiber connectors 106 in the sliding chassis assembly 110. The fixed tray 108 has the open back 118 and the management module 140 can be inserted in the management module holder 180. The cable 166 can be connected to the circuit board 164, and the circuit board 164 can be connected to the management port 138 on the front faceplate 136. The fiber connectors 106 are inserted and connected through the openings 182 of the front faceplate 136.

Figure 19:
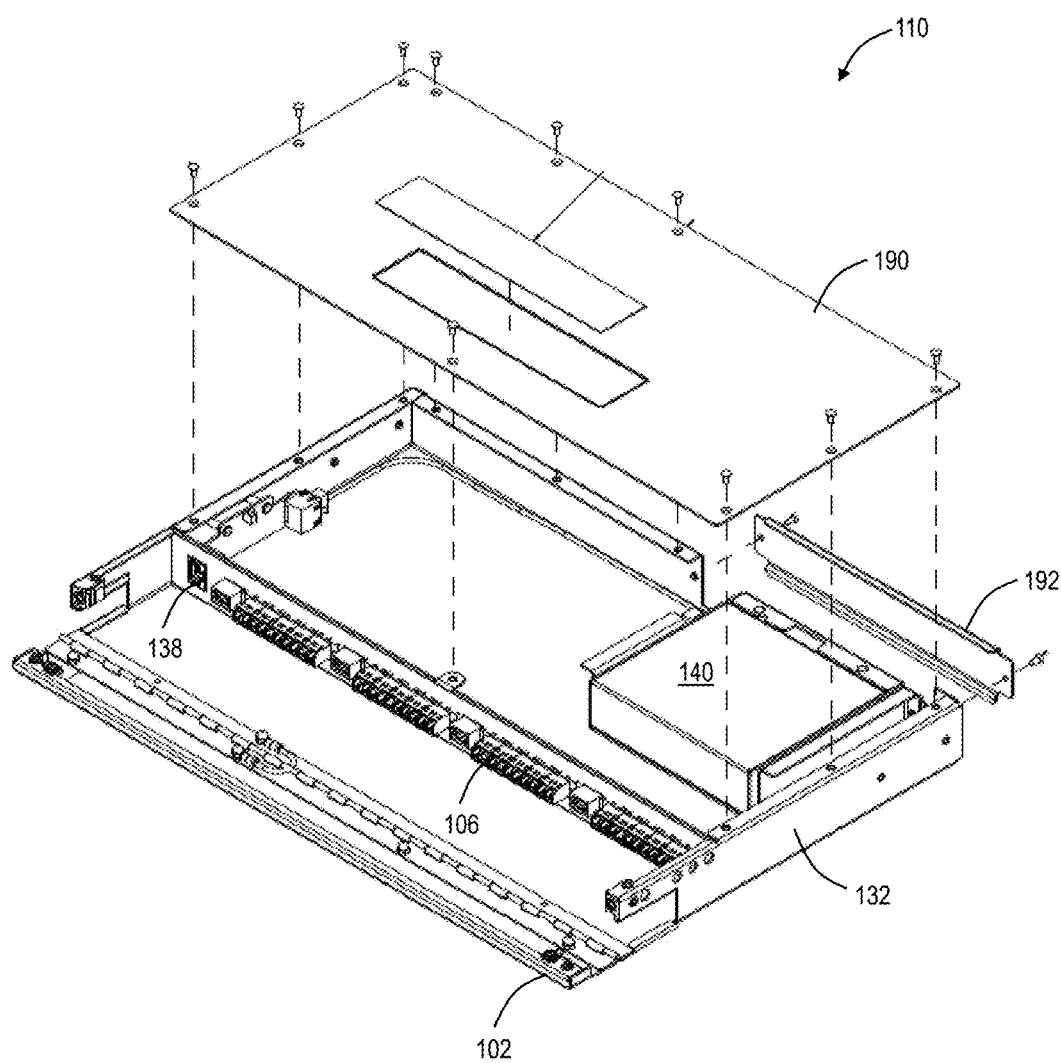
FIG. 19 is a perspective view a cover and a back management module cover connected to the sliding chassis assembly of the hybrid chassis of FIGS. 5-18.
Figure 20:
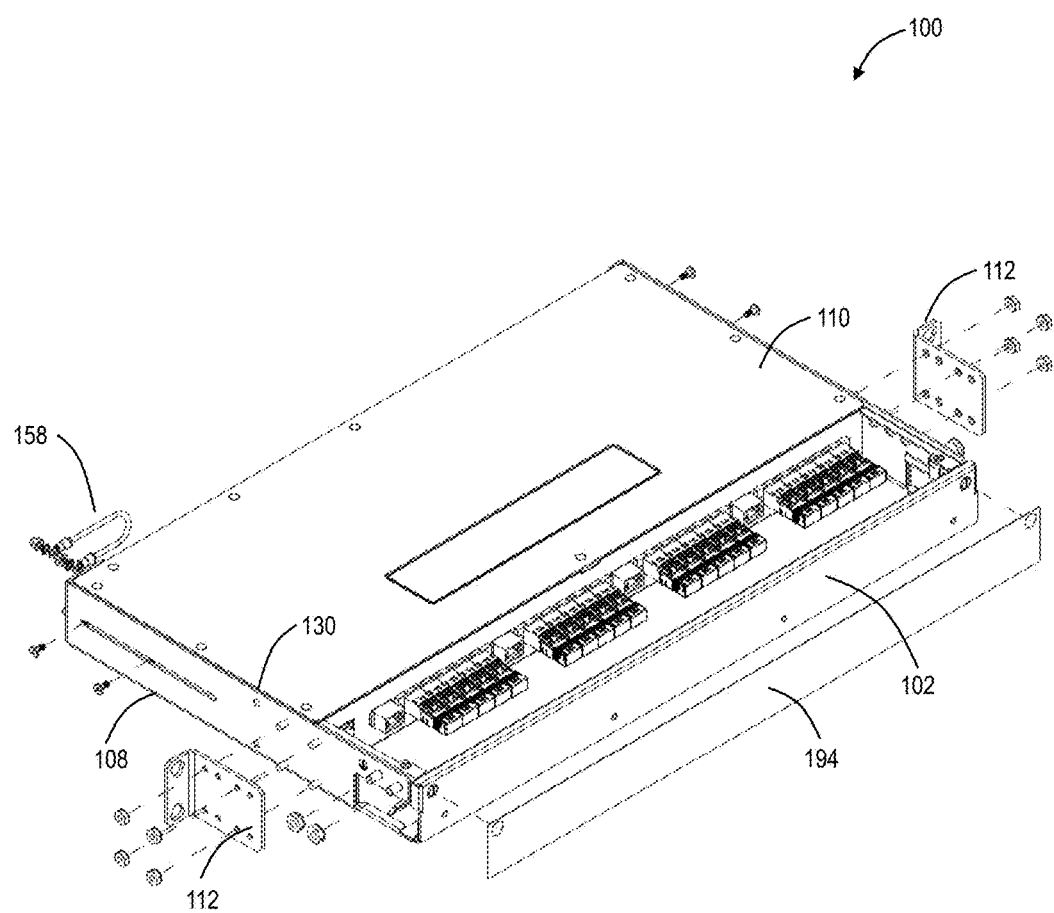
FIG. 20 is a perspective diagram of a connection of the side brackets to the fixed tray via the holes and pins and connection of the ground wire between the fixed tray and the sliding chassis assembly of the hybrid chassis of FIGS. 5-19.
Figure 21:
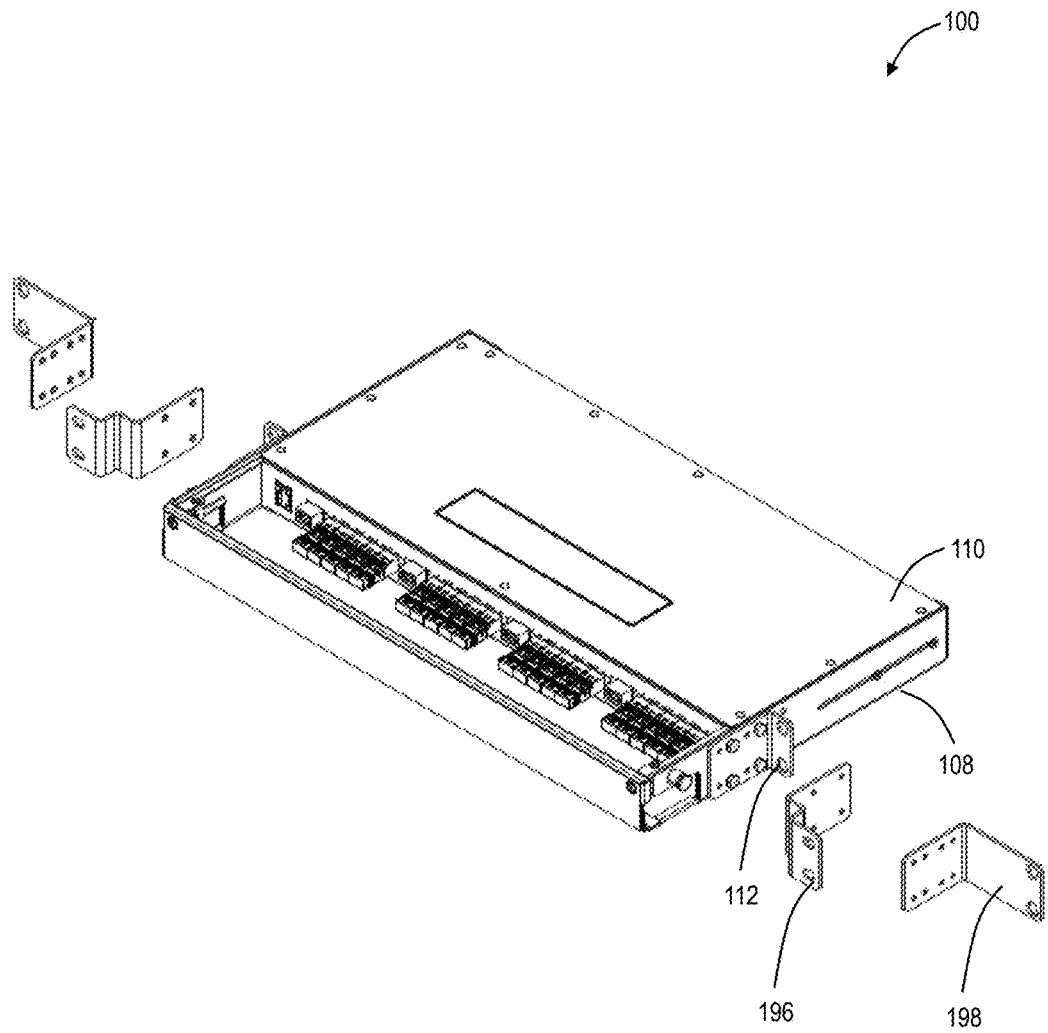
FIG. 21 illustrates alternative side brackets that can be coupled to the fixed tray of the hybrid chassis of FIGS. 5-20 for connectivity to a rack or frame.
Figure 22:
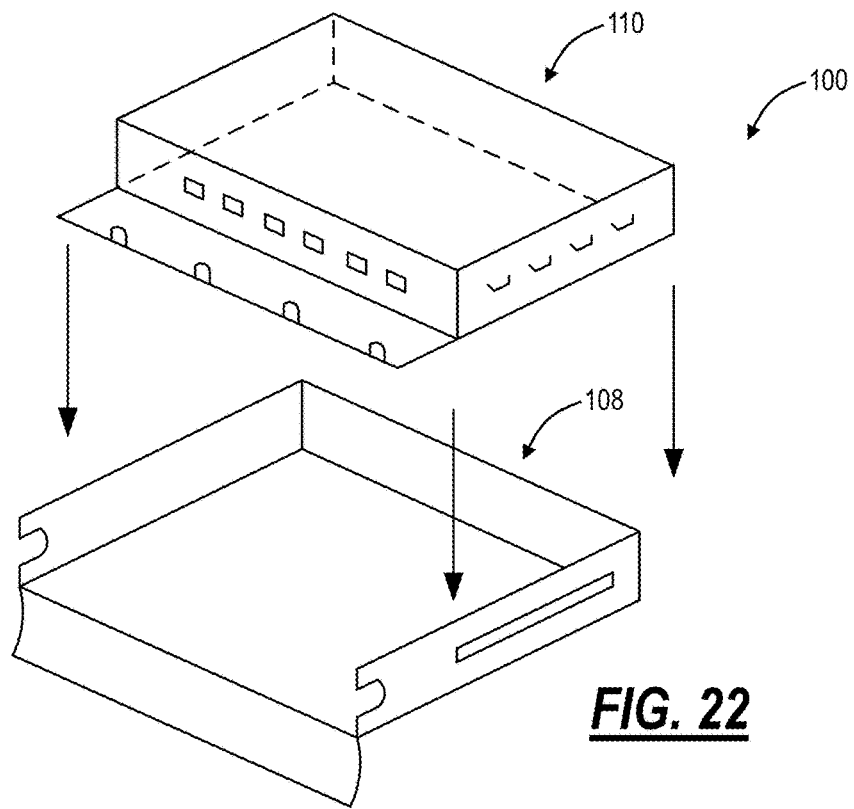
FIGS. 22 and 23 are perspective diagrams of an exemplary approach for inserting the sliding chassis assembly into the fixed tray of the hybrid chassis of FIGS. 5-21.
Figure 23:
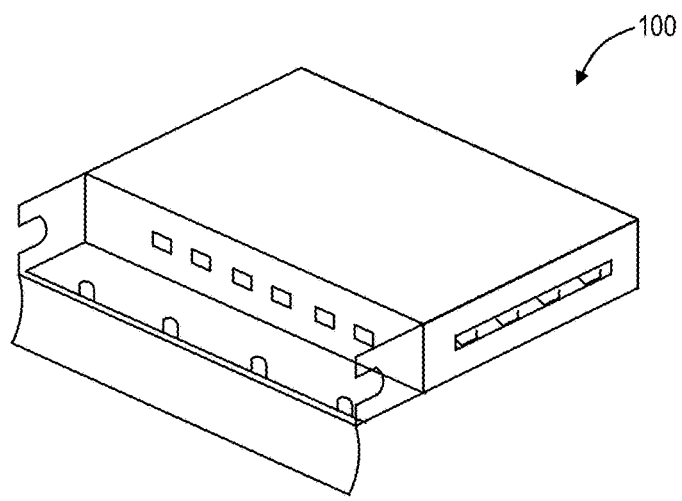

FIG. 19 illustrates a cover 190 and a back management module cover 192 connected to the sliding chassis assembly 110. The cover 190 and the back management module cover 192 can be screwed on the sliding chassis assembly 110 to enclose physically the interior of the sliding chassis assembly 110. Note, there are various fiber cross connections inside the sliding chassis assembly 110 which are omitted for illustration purposes. FIG. 20 illustrates the connection of the side brackets 112 to the fixed tray 108 via the holes and pins 130 and connection of the ground wire 158 between the fixed tray 108 and the sliding chassis assembly 110 and a label 194 is adhered to the door 102. FIG. 21 illustrates alternative side brackets 196, 198 that can be coupled to the fixed tray 108 for connectivity to a rack or frame. Note, there can be one set of side brackets for 19" frames, one set for 23" frames, one set for ETSI frames, etc. Referring to FIGS. 22 and 23, in an exemplary embodiment, a perspective diagram illustrates one exemplary approach for inserting the sliding chassis assembly 110 into the fixed tray 108 of the hybrid chassis 100. Specifically, the fixed tray 108 can be a drawer with an open top and a rotatable door 102 and the sliding chassis assembly 110 can be inserted in the fixed tray 108 via the open top.

Figure 24:
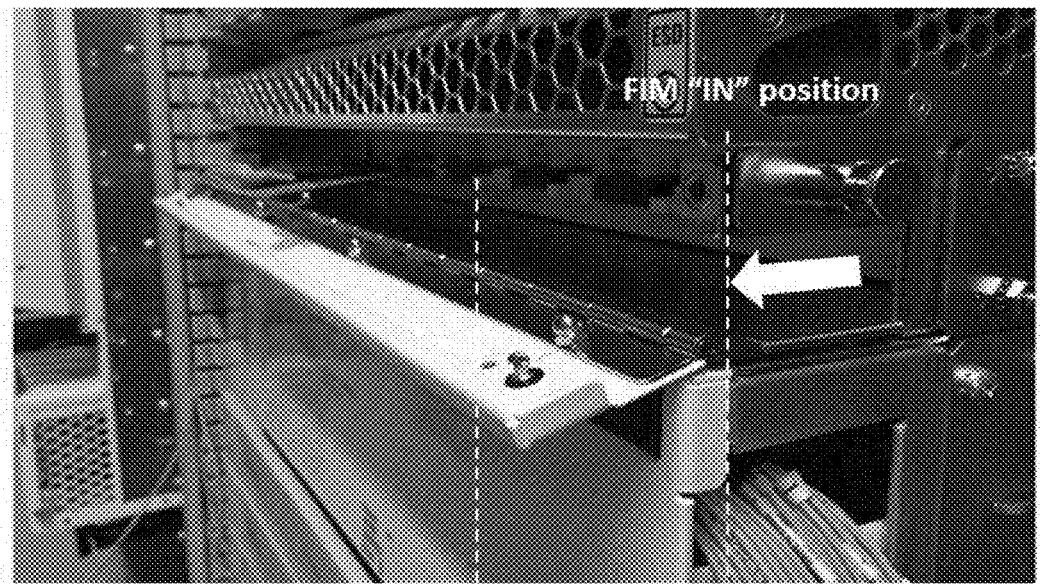
FIGS. 24 and 25 are pictures of the hybrid chassis of FIGS. 5-23 with the sliding chassis assembly in the operating position (FIG. 24) and in the maintenance position (FIG. 25)
Figure 25:
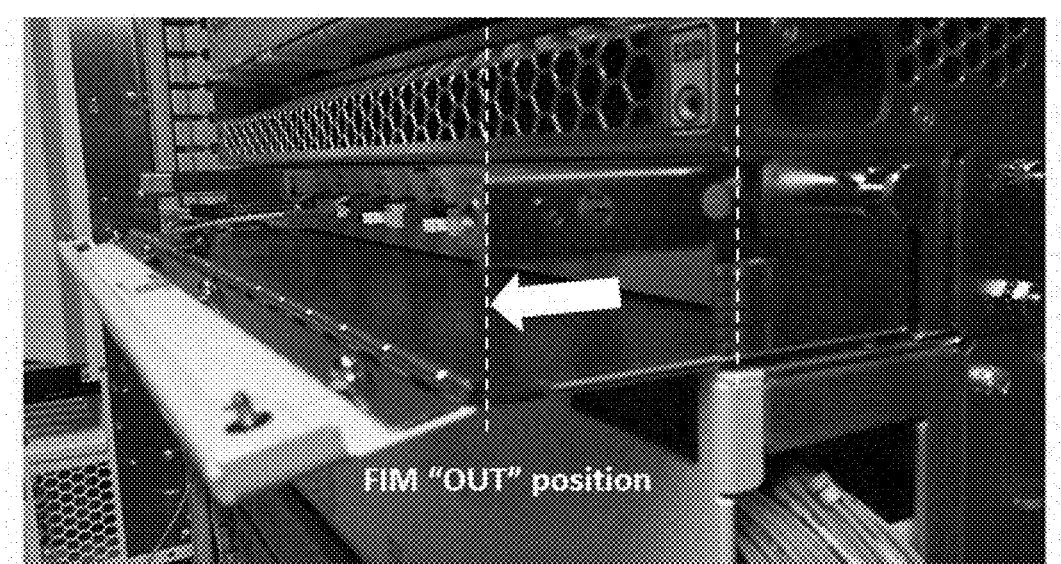

Referring to FIGS. 24 and 25, in an exemplary embodiment, pictures illustrate the hybrid chassis 100 with the sliding chassis assembly 110 in the operating position (FIG. 24) and in the maintenance position (FIG. 25).

Figure 26:
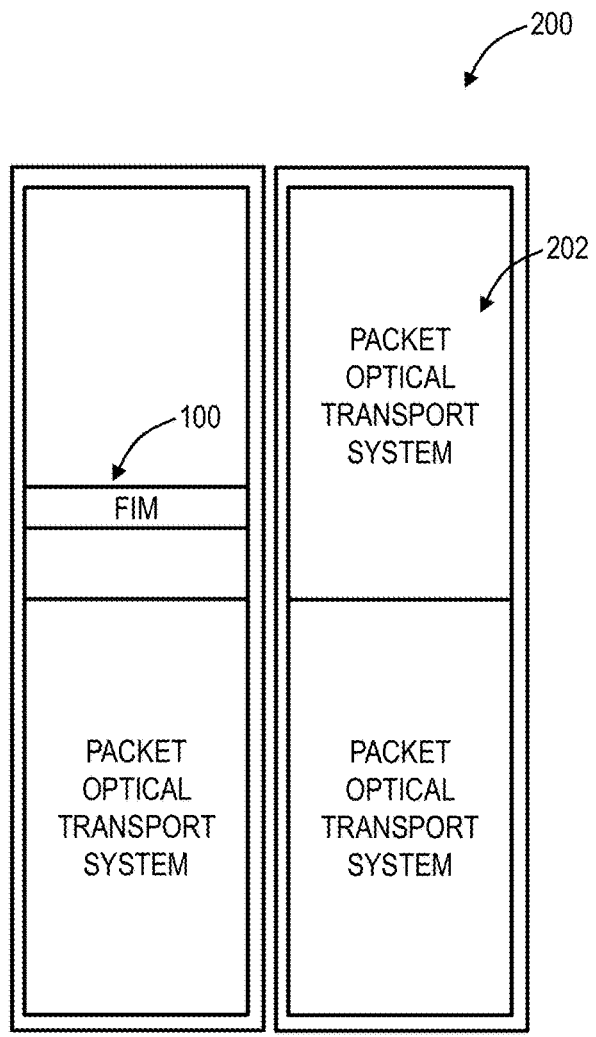
FIG. 26 is a block diagram of racks illustrating an exemplary operating environment for the hybrid chassis of FIGS. 5-25.

Referring to FIG. 26, in an exemplary embodiment, a block diagram illustrates racks illustrating an exemplary operating environment for the hybrid chassis 100. The racks 200 can be any type of rack, frame, cabinet, etc. used in a telecom central office, data center, Point of Presence (POP), IT closet, hut, etc. Again, in an exemplary embodiment, the hybrid chassis 100 is an FIM used in an optical network element, such as a Packet Optical Transport System (POTS) 202. The hybrid chassis 100 can be configured to connect various components of the POTS to one another in the racks 200, such as multiplexers, demultiplexes, WSSs, OSCs, OTDRs, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A hybrid chassis for fiber management, the hybrid chassis comprising:
   a fixed tray adapted to mount to one of a rack and a frame;
   a sliding chassis assembly housed in the fixed tray;
   at least one fiber connector on a front faceplate of the sliding chassis assembly;
   an internal cross connection in the sliding chassis assembly coupled to the at least one fiber connector; and
   a sliding mechanism between the sliding chassis assembly and the fixed tray providing constrained linear sliding of the sliding chassis assembly backward and forwards in a constrained linear travel range between at least two positions comprising an operating, recessed position and a maintenance, fiber access position.

2. The hybrid chassis of claim 1, wherein the sliding mechanism comprises one or more notches on at least one side of the sliding chassis assembly engaging a slot of at least one side of the fixed tray, wherein the one or more notches are positioned to provide the constrained sliding.

3. The hybrid chassis of claim 1, wherein no fiber slack management is required in the hybrid chassis based on the constrained sliding.

4. The hybrid chassis of claim 1, wherein, in the operating, recessed position, the sliding chassis assembly is recessed by about 3.3" in the fixed tray, wherein, in the maintenance, fiber access position, the sliding chassis assembly is recessed by about 1.3" for fiber access, and wherein the constrained sliding is about 2".

5. The hybrid chassis of claim 1, wherein the at least one fiber connector comprises a Multifiber Push-On (MPO) connector requiring at least 3" of clearance between the front faceplate and a door of the sliding chassis assembly, and wherein the constrained sliding is about 2" to provide physical access to the MPO connector.

6. The hybrid chassis of claim 1, wherein the at least one fiber connector comprises one or more of a Multifiber Push-On (MPO) connector, a Standard Connector (SC), and a Lucent Connector (LC).

7. The hybrid chassis of claim 1, further comprising:
   a door rotatably connected to the sliding chassis assembly; and
   a ground wire connected to the door and the sliding chassis assembly, wherein the ground wire is adapted to maintain grounding whether the door is open or closed, wherein the ground wire is configured to flex and contract based on relative movement of the door.

8. The hybrid chassis of claim 1, further comprising:
   a ground wire connected to the fixed tray and the sliding chassis assembly, wherein the ground wire is adapted to maintain grounding in the at least two positions and to flex and contract based on relative movement between the at least two positions.

9. The hybrid chassis of claim 1, further comprising:
   a management port on the front faceplate of the sliding chassis assembly; and
   a management module in the sliding chassis assembly, wherein the management module is powered via a cable connected to the management port.

10. The hybrid chassis of claim 1, wherein the hybrid chassis is front access only and at least one back side fiber connector coupled to the at least one fiber connectors is cleaned through the at least one fiber connector.

11. The hybrid chassis of claim 1, wherein the hybrid chassis is a Fiber Interface Module and the at least one fiber connector provides intra-network element connectivity between modules of an optical network element.

12. A method for a hybrid chassis for fiber management, the method comprising:
   providing a fixed tray adapted to mount to one of a rack and a frame;
   providing a sliding chassis assembly housed in the fixed tray;

providing at least one fiber connector on a front faceplate of the sliding chassis assembly;
providing an internal cross connection in the sliding chassis assembly coupled to the at least one fiber connector; and
providing a sliding mechanism between the sliding chassis assembly and the fixed tray providing constrained linear sliding of the sliding chassis assembly backward and forwards in a constrained linear travel range between at least two positions comprising an operating, recessed position and a maintenance, fiber access position.

13. The method of claim 12, wherein the sliding mechanism comprises one or more notches on at least one side of the sliding chassis assembly engaging a slot of at least one side of the fixed tray, wherein the one or more notches are positioned to provide the constrained sliding.

14. The method of claim 12, wherein no fiber slack management is required in the hybrid chassis based on the constrained sliding.

15. The method of claim 12, wherein, in the operating, recessed position, the sliding chassis assembly is recessed by about 3.3" in the fixed tray, wherein, in the maintenance, fiber access position, the sliding chassis assembly is recessed by about 1.3" for fiber access, and wherein the constrained sliding is about 2".

16. The method of claim 12, wherein the at least one fiber connector comprises a Multifiber Push-On (MPO) connector requiring at least 3" of clearance between the front faceplate and a door of the sliding chassis assembly, and wherein the constrained sliding is about 2" to provide physical access to the MPO connector.

17. The method of claim 12, further comprising:
providing a door rotatably connected to the sliding chassis assembly; and
providing a ground wire connected to the door and the sliding chassis assembly, wherein the ground wire is adapted to maintain grounding whether the door is open or closed, wherein the ground wire is configured to flex and contract based on relative movement of the door.

18. The method of claim 12, further comprising:
providing a ground wire connected to the fixed tray and the sliding chassis assembly, wherein the ground wire is adapted to maintain grounding in the at least two positions and to flex and contract based on relative movement between the at least two positions.

19. The method of claim 12, further comprising:
providing a management port on the front faceplate of the sliding chassis assembly; and
providing a management module in the sliding chassis assembly, wherein the management module is powered via a cable connected to the management port.

20. The method of claim 12, wherein the hybrid chassis is front access only and at least one back side fiber connector coupled to the at least one fiber connector is cleaned through the at least one fiber connector.

* * * * *